W. T. BOWEN.
Stove-Shelf and Heating-Drum.

No. 204,475. Patented June 4, 1878.

WITNESSES:
Henry N. Miller
C. Sedgwick

INVENTOR:
W. T. Bowen
BY
ATTORNEYS.

UNITED STATES PATENT OFFICE.

WILLIAM T. BOWEN, OF RIDGEWAY, IOWA.

IMPROVEMENT IN STOVE-SHELVES AND HEATING-DRUMS.

Specification forming part of Letters Patent No. 204,475, dated June 4, 1878; application filed April 3, 1878.

*To all whom it may concern:*

Figure 1:
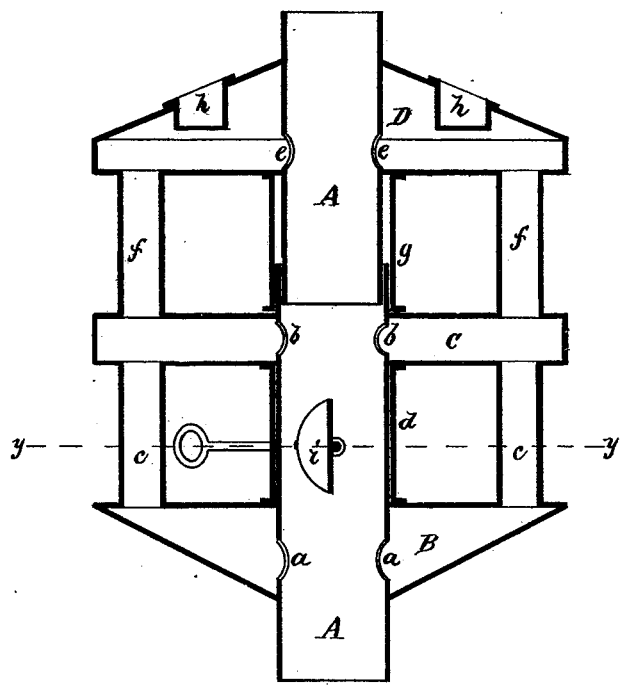
Figure 2:
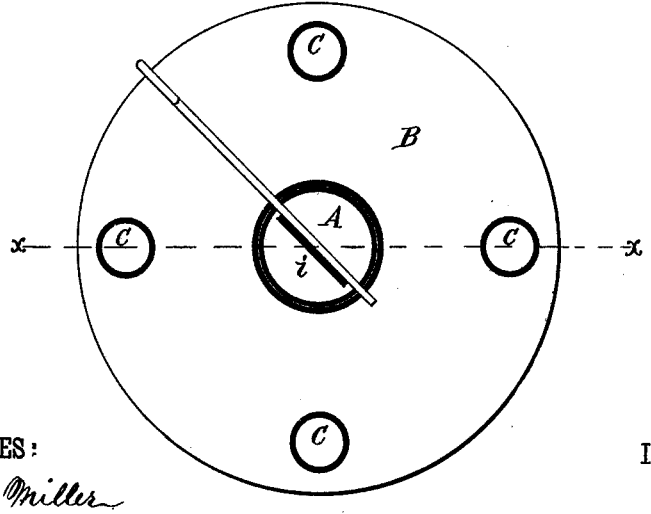

Be it known that I, WILLIAM T. BOWEN, of Ridgeway, in the county of Winneshiek and State of Iowa, have invented a new and Improved Stove-Shelf and Heating-Drum, of which the following is a specification:

Figure 1 is a vertical section taken on line $x\,x$ in Fig. 2. Fig. 2 is a horizontal section taken on line $y\,y$ in Fig. 1.

The object of my invention is to provide a heating-drum for attachment to stove-pipes, which will also serve as a stove-shelf.

The invention consists in two conical end sections and a flat middle section connected with the end section by short pipes, leaving a space between the sections for articles to be heated.

Referring to the drawing, A is a pipe of the size to which the improvement is applied, and B is an inverted hollow cone placed on the said pipe and communicating therewith through the holes $a$. Above the hollow cone there is a flat drum, C, which communicates with the pipe A through apertures $b$, and is connected with the cone below by pipes $c$.

The drum is also further supported by the thimble $d$, which rests upon the cone B and surrounds the pipe A.

To the upper section of the pipe A a hollow cone, D, is secured, which communicates with the pipe through apertures $e$ and with the drum C through short pipes $f$. The cone is also supported by a thimble, $g$, which surrounds the pipe A and rests upon the drum C.

In the upper surface of the cone there are cups or recesses $h$ for containing water to render the air humid by evaporation, or for containing articles to be warmed.

The pipe A is provided with a damper, $i$, which is turned so as to close the pipe A when it is desired to throw the products of combustion through the heating-drum.

This device, when applied to cooking-stoves and ranges, forms a convenient support for vessels of various kinds used about the stove or range. It also takes the place of the warming-closet commonly applied to stoves.

Slides are provided in the bottom of the drum for the removal of soot and ashes.

Having thus described my invention, what I claim as new, and desire to secure by Letters Patent, is—

In a heating-drum for attachment to stove-pipes, the combination, with inverted hollow cones B D and the central dampered main pipe A, having holes $a\,b$, of the flat drum C, connected with cones by pipes $c\,f$, and supported by thimble $d$, as shown and described.

WILLIAM THOMAS BOWEN.

Witnesses:
   E. T. ALLEN,
   S. PIKE.